United States Patent [19]
Ahern

[11] Patent Number: 4,621,282
[45] Date of Patent: Nov. 4, 1986

[54] TRANSMITTING STEREO AUDIO PROGRAMS IN CABLE TV SYSTEMS

[75] Inventor: David J. Ahern, Ipswich, England

[73] Assignee: British Telecommunications plc, London, England

[21] Appl. No.: 727,555

[22] Filed: Apr. 26, 1985

[30] Foreign Application Priority Data

Apr. 26, 1984 [GB] United Kingdom ............... 8410671

[51] Int. Cl.⁴ ............................................. H04N 7/22
[52] U.S. Cl. ............................................. 358/86; 370/4
[58] Field of Search ............... 358/86, 144, 901; 370/1, 3, 4, 73, 99, 124; 455/3, 6, 23

[56] References Cited

U.S. PATENT DOCUMENTS

| | | | |
|---|---|---|---|
| 3,860,873 | 1/1975 | Ringstad | 370/124 X |
| 4,183,054 | 1/1980 | Patisaul et al. | 358/86 |
| 4,513,315 | 4/1985 | Dekker et al. | 358/86 |

FOREIGN PATENT DOCUMENTS

| | | | |
|---|---|---|---|
| 58446 | 8/1982 | European Pat. Off. | |
| 63639 | 11/1982 | European Pat. Off. | |
| 144770 | 6/1985 | European Pat. Off. | 358/86 |
| 3128182 | 2/1983 | Fed. Rep. of Germany | |
| 3208308 | 9/1983 | Fed. Rep. of Germany | |
| 59-15387 | 1/1984 | Japan | 358/86 |
| 59-15388 | 1/1984 | Japan | 358/86 |
| 2110034 | 6/1983 | United Kingdom | |

OTHER PUBLICATIONS

Mesiya et al., "Mini-Hub Addressable Distribution System for Hi-Rise Application", Phoenix Conference on Computers and Communications, Phoenix, AZ, USA (May 9-12, 1982), pp. 346-351.

W. K. Ritchie, "Multi-Service Cable Television Distribution Systems", *British Telecommunications Engineering*, vol. 1, Jan. 1983, pp. 205-210.

"Transmission of Wideband Signals on Optical Fibres" by W. Roker, 13th International TV Symposium, Montreux, Symposium Record CATV Sessions, May 28-- Jun. 2, 1983, pp. 316-324.

"Initial Experience with the Milton Keynes Optical Fiber Cable TV Trial" by Fox et al., *IEEE Transactions on Communications*, vol. COM-30, No. 9, Sep. 1982, pp. 2155-2162.

"A Digital Television Fibre-Optic Trunking System" by W. W. Cotten, International Conference on Communications, vol. 2, IEEE catalogue No. 78CH1350-8 CSCB, Toronto, 1978, pp. 21.2.1-21.2.4.

*Primary Examiner*—Keith E. George
*Attorney, Agent, or Firm*—Nixon & Vanderhye

[57] ABSTRACT

Stereo audio signals are transmitted over optical fibres in a cable TV system in which stereo radio signals are received and demodulated to produce respective stereo multiplex signals. These stereo multiplex signals are then sampled, digitized and combined to produce a digital multiplex. The digital multiplex is carried over an optical fibre by first modulating the frequency of a video sub-carrier which in turn modulates the intensity of light emitted by a light source. At a switching point stereo multiplex signals are regenerated which modulate FM carriers having substantially the same frequency as the original radio signals.

4 Claims, 4 Drawing Figures

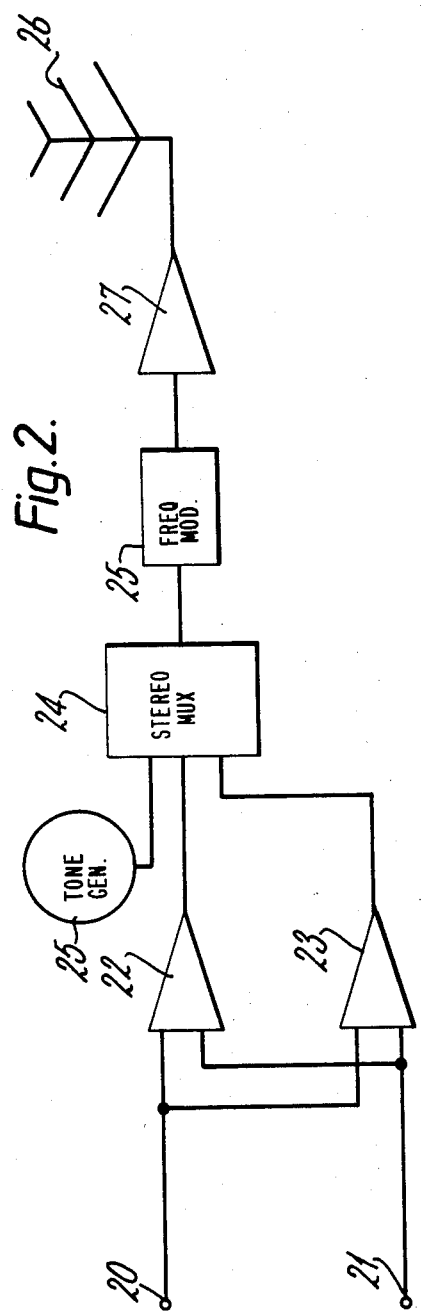
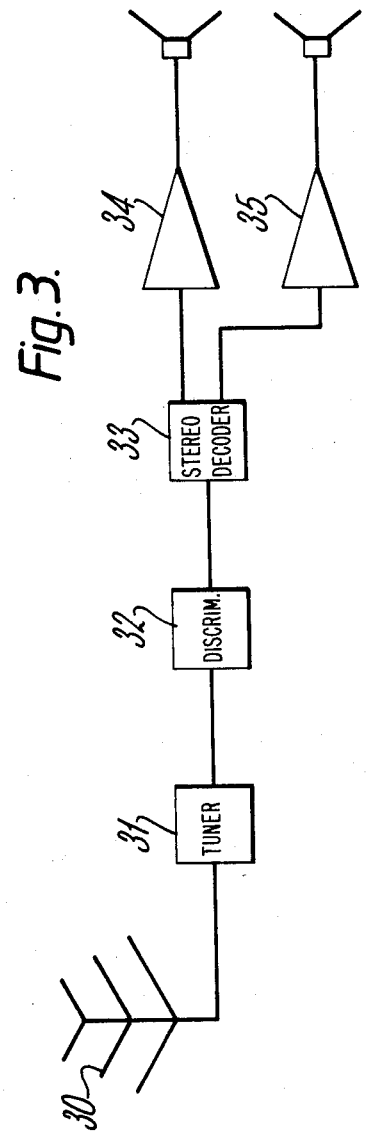

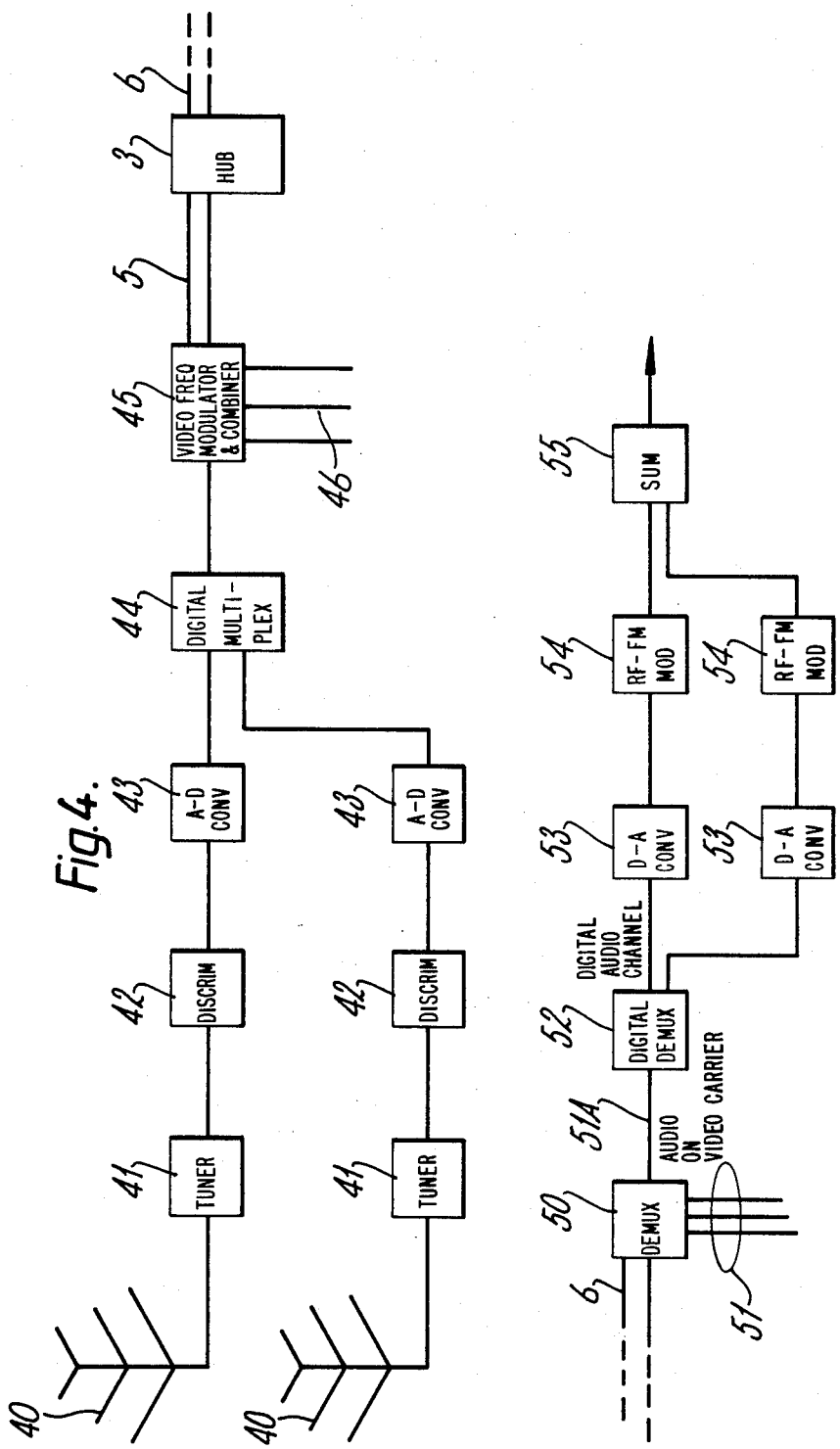

4,621,282

TRANSMITTING STEREO AUDIO PROGRAMS IN CABLE TV SYSTEMS

This invention relates to transmitting stereo audio programmes in cable television systems.

BACKGROUND OF THE INVENTION

A cable television network is primarily designed to distribute television signals from a central station to the homes of individual customers. In some networks the final link to the customer only conveys programmes which are actually being viewed and channel selection occurs at a switching point. However in all practical networks some links are required to convey the total output of the central station and these may be termed primary links.

A cable television network may also be arranged to convey other signals in addition to television programmes, for example digital codes for computers and stereo audio programmes. However, station operators are mainly concerned with having a sufficient number of video links on the assumption that these will provide the highest return on investment. It is therefore desirable to arrange the primary links as a collection of video channels each designed to convey a television signal.

The bandwidth of a video channel provides sufficient space for many frequency modulated (FM) audio signals each occupying approximately 53 kHz. However experiments have shown that a video channel producing the maximum tolerable amount of noise for good reception of television programmes produces too much noise for satisfactory reproduction of stereo audio signals. It is therefore an object of this invention to improve the quality of stereo audio signals transmitted in cable television systems.

SUMMARY OF THE INVENTION

According to the present invention there is provided a cable TV system including a central station at which programmes originate, a customer's end, a switching point, an optical fibre connecting said central station to said switching point, a light source for directing light down said optical fibre, an optical receiver and a down drop connecting the switching point to the customer's end. The apparatus for transmitting stereo audio signals comprising at said central station:

means for receiving a plurality of stereo radio signals;
means for demodulating each of said radio signals to produce respective stereo multiplex signals;
means for sampling each of said stereo multiplex signals, producing a digital representation of said samples and multiplexing said digital representations to produce a digital multiplex;
means for generating a video carrier;
means for modulating the frequency of said video carrier in response to said digital multiplex; and
means for modulating the intensity of light emitted by said light source in response to said modulated video carrier.

The apparatus at said switching point comprises:

means for demodulating said video carrier to produce the digital multiplex, and converting each digital representation to an analogue signal thus reconstituting said stereo multiplex signals;
means for generating an FM carrier for each of said stereo multiplex signals;
means for modulating the frequency of each of said FM carriers in response to its respective stereo multiplex signal, and
means for applying the modulated FM carriers to the down drop for transmission to the customer's end frequency division multiplex.

Preferably the video carrier is one of a group of similar video carriers each of which having a predetermined frequency, the frequency of each of said carriers is modulated, and the intensity of said light is modulated by the sum of said carriers.

Preferably the other video carriers are modulated in response to baseband television signals.

Preferably each FM carrier generated at the switching point is at substantially the same frequency as the frequency on which its respective stereo multiplex is conveyed by radio.

BRIEF DESCRIPTION OF THE DRAWINGS

FIG. 2 is a block diagram of a conventional FM radio transmitter;

FIG. 3 is a block diagram of a conventional FM radio receiver; and,

FIG. 4 is a block diagram of a system for transmitting a plurality of stereo audio signals over a video channel of a cable television network.

DESCRIPTION OF THE PREFERRED EMBODIMENT

Figure 1:
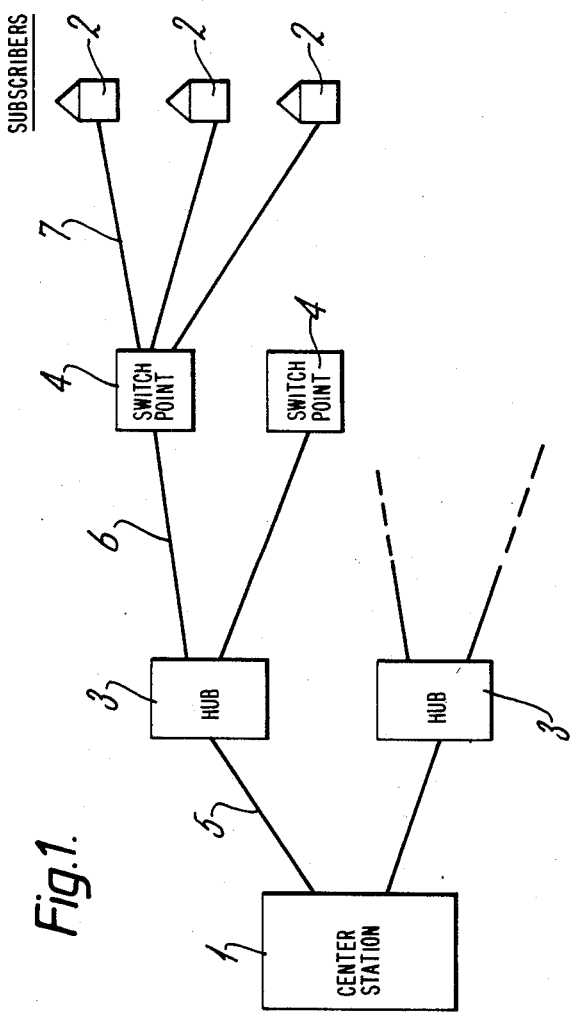
FIG. 1 is a block diagram of a multi-star cable television network.

A multi-star cable television network is shown in FIG. 1 in which TV programmes, audio programmes and data are supplied from a central station 1 to a plurality of houses 2 via hubsites 3 and switching points 4. All of the information produced by the central station 1 is transmitted to the hubsites 3 and the switching points 4 by primary links while at the switching points selected channels are switched to individual customers. Each link 5 between the central station and the hubsite may be up to 20 kilometers (km) in length and is formed from a group of monomode optical fibres. Each link between a hubsite 3 and a switching point 4 may be up to 5 km in length and is formed from a group of multimode fibres.

Four TV compatible signals are transmitted down each fibre in each link 5 by firstly frequency modulating video carriers of different frequencies which are then added. The resulting multiplexed video signals then modulate the intensity of light generated by an optical transmitter (in the form of a laser) which directs light down the fibre. A number of optical receivers at each hub site, one for each fibre in link 5, reproduce the video multiplex signals which, after amplification, modulate the intensity of light directed down the fibres in the links 6. At each switching point optical receivers and demodulating circuits reproduce the TV compatible signals. True TV signals are amplitude modulated and filtered to produce vestigial sideband (VSB) signals and selected VSB signals are supplied to customers by frequency division multiplex over a down-drop 7. Each down-drop 7 may also be an optical fibre but at some stage a signal must be converted into a form which can be supplied to available television inputs, radio inputs or computer interfaces. The circuitry for performing this function is less complicated, and therefore the total cost is reduced, if the final down drop is a coaxial cable having a bandwidth of 0–110 MHz thus providing ample space for two video channels, a duplex data channel and stereo audio programmes.

Stereo audio programmes are transmitted over the down drop by frequency modulation of carriers each of which may have a frequency equal to that of the equivalent radio broadcast. A diagramatic representation of a conventional stereo transmitter is shown in FIG. 2 and a similar representation of a receiver is shown in FIG. 3. A stereo signal consisting of a left channel 20 and a right channel 21 is applied to a summing circuit 22 and to a difference circuit 23 to form sum and difference signals which are applied to a multiplexer 24. The multiplexer 24 also receives a constant tone from a signal generator 25 and produces a stereo multiplex signal. This is then applied to a frequency modulator 25 which modulates the frequency of a radio frequency (RF) carrier. The modulated RF carrier is then applied to an aerial 26 via a suitable amplifier 27.

A receiver aerial 30 and a tuned circuit 31 (FIG. 3) supply the modulated carrier to a discriminator 32 which reproduces the stereo multiplex signal. The left and right channels are then reconstituted by a circuit 33 and amplified by respective amplifiers 34 and 35. It should be noted that the stereo multiplex signal is generated internally within a transmitter or a receiver and is not available as an output.

Before audio signals derived from radio broadcasts may be transmitted over the primary links of a cable television system they must be converted into one or more video compatible signals. The frequency of a modulating carrier must therefore be changed if the signals are to be conveyed by frequency modulation. However an optimum video channel produces too much noise over the primary links for satisfactory stereo signals to be transmitted by conventional frequency modulation. Noise is generated in the system from many sources, for example, shot noise generated in the receiver photodiode, amplifier noise and noise due to non-linearities in the system.

Looking at the radio transmitter shown in FIG. 2 a stereo signal is available from two sources, either of which may be modified to improve the overall signal to noise ratio. Firstly the left channel 20 and the right channel 21 may be modulated separately each with sufficient bandwidth to provide a high signal to noise ratio, or secondly the modulation index of the radio output may be increased using a multiplier/translator combination. However an ideal solution should make efficient use of the available bandwidth of the video link while requiring a minimum amount of circuitry at each switching point. A preferred embodiment of such a system is shown in FIG. 4.

At the central station 1 (FIG. 1) stereo radio signals are received by aerials 40 and tuned circuits 41. Discriminators 42 then remove the carrier from the stereo multiplex signals which are not demodulated to left and right stereo channels but are sampled by analogue to digital converters 43. The outputs from a plurality of analogue to digital converters 43 are multiplexed in a time division manner by a digital multiplexer 44 to provide a digital multiplex signal. This digital signal is supplied to a unit 45 where it modulates the frequency of a carrier which in turn is combined with similarly modulated carriers supplied on lines 46. The resulting video multiplex is transmitted over the primary links in a conventional manner as previously described.

At each switching point 4 the output from a multimode fibre is supplied to a frequency demultiplexer 50 which separates the four video channels onto separate cables 51. A cable 51A conveying audio information is supplied to a digital demultiplexer 52 which produces the individual audio signals in digital form. Each of said digital signals is then applied to a respective digital to analogue converter 53 which reproduce the stereo multiplex signals. Each of said stereo multiplex signals modulates the frequency of a carrier waveform by means of a modulator 54 and the output from each modulator is combined by a summing circuit 55 in a frequency division manner; as previously stated, the frequency of each carrier may be the same as the frequency of the conventional radio broadcast. The FM stereo audio signals are then supplied to a customer with selected television signals and data transmissions.

What we claim is:

1. In a cable TV system including a central station at which programmes originate, a customer's end, a switching point, an optical fibre connecting said central station to said switching point, a light source at the central station for directing light down said optical fibre, and a down drop connecting the switching point to the customer's end:

apparatus for transmitting stereo audio signals comprising at said central station;
    means for receiving a plurality of stero radio signals;
    means for demodulating each of said radio signals to produce respective stereo multiplex signals;
    means for sampling each of said stereo multiplex signals; producing a digital representation of said samples and multiplexing said digital representations to produce a digital multiplex;
    means for generating a video carrier;
    means for modulating the frequency of said video carrier in response to said digital multiplex; and
    means for modulating the intensity of light emitted by said light source in response to said modulated video carrier:
and further comprising at said switching point;
    means for receiving said demodulating light from the fibre to derive the modulated video carrier,
    means for demodulating said video carrier to produce the digital multiplex, and converting each digital representation to an analogue signal thus reconstituting the stereo multiplex signals;
    means for generating an FM carrier for each of said stereo multiplex signals;
    means for modulating the frequency of each of said FM carriers in response to its respective stereo multiplex signal, and
    means for applying the modulated FM carriers to the down drop for transmission to the customer by frequency division multiplex.

2. Apparatus in cable TV system according to claim 1 in which the video carrier is one of a group of similar video carriers each of which having a predetermined frequency, the frequency of each of said carriers is modulated, and the intensity of said light is modulated by the sum of said carriers.

3. Apparatus in a cable TV system according to claim 2 in which another of the video carriers is modulated in response to a baseband television signal.

4. Apparatus in a cable TV system according to claim 1 in which each FM carrier generated at the switching point is at substantially the same frequency as the frequency in which its respective stereo multiplex is conveyed by radio.

* * * * *